United States Patent
Roll et al.

[11] Patent Number: 5,817,232
[45] Date of Patent: Oct. 6, 1998

[54] REBUILDABLE SPIN-ON FILTERS

[75] Inventors: Mark A. Roll, Bessemer City; Gregory K. Rhyne, Denver, both of N.C.

[73] Assignee: Dana Corporation, Toledo, Ohio

[21] Appl. No.: 582,641

[22] Filed: Jan. 4, 1996

Related U.S. Application Data

[63] Continuation-in-part of Ser. No. 274,075, Jul. 12, 1994, abandoned.

[51] Int. Cl.$^6$ .................................................. B01D 35/147
[52] U.S. Cl. ........................ 210/130; 210/136; 210/440; 210/450; 210/453; 210/455
[58] Field of Search ................................ 210/168, 130, 210/136, 440, 443, 444, 450, 453, 455, 232, DIG. 17; 123/196 A

[56] References Cited

U.S. PATENT DOCUMENTS 3,036,711  5/1962  Wilheim .
4,051,031  9/1977  Suzuki ................................... 210/136
4,622,136  11/1986  Karcey .................................. 210/168
5,066,391  11/1991  Faria .
5,085,769  2/1992  Klausen et al. ........................ 210/232
5,215,658  6/1993  Luby ..................................... 210/453
5,413,712  5/1995  Gewiss et al. ......................... 210/455

FOREIGN PATENT DOCUMENTS 1526501  9/1978  United Kingdom .................. 210/450

*Primary Examiner*—Matthew O. Savage
*Attorney, Agent, or Firm*—Millen, White, Zelano & Branigan, P.C.

[57] ABSTRACT

A spin-on type filter assembly for lubricating oil includes a cast aluminum housing which contains a replaceable annular filter element. The filter element is resiliently retained in the housing by compressing a gasket thereon with a threaded end cap which closes one end of the housing. The housing includes a unitary front end wall with a plurality of inlet ports surrounding an axially positioned outlet port. In order to provide a secure coupling with the engine, an externally and internally threaded steel stud is threadably mounted in the outlet port for threadably coupling with the engine.

4 Claims, 3 Drawing Sheets

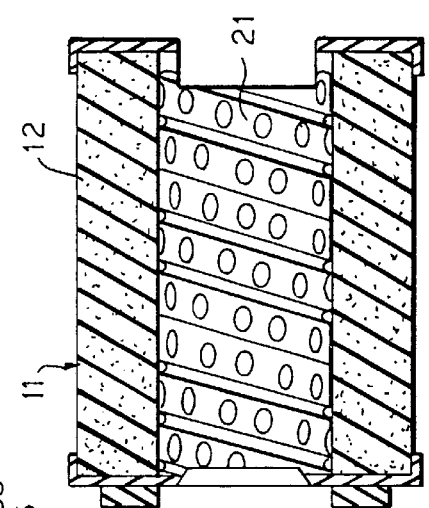
FIG. 3
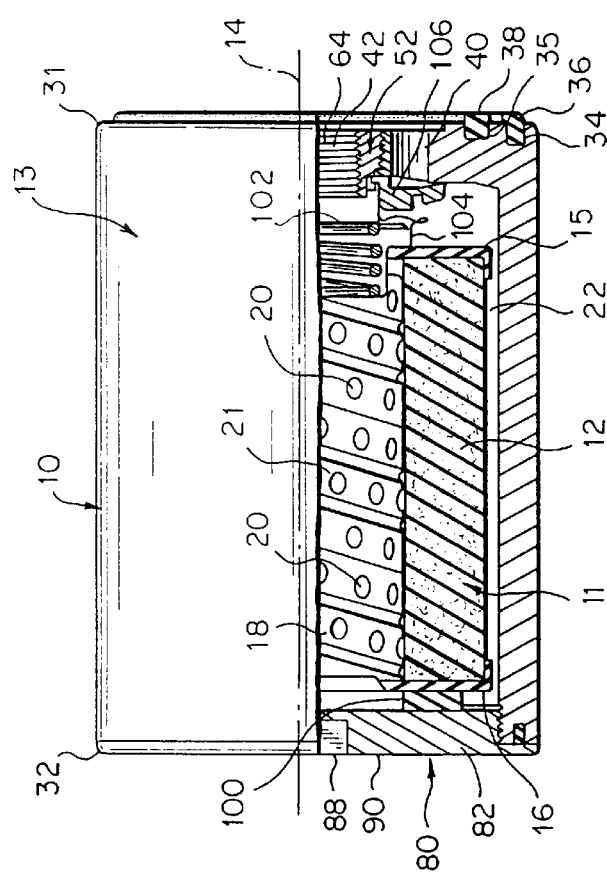
FIG. 1
FIG. 2

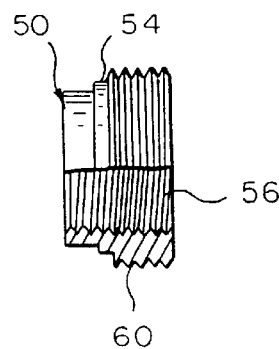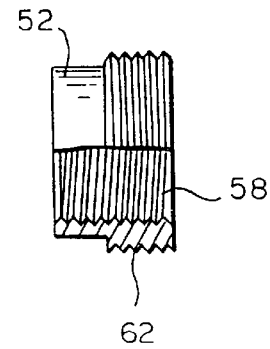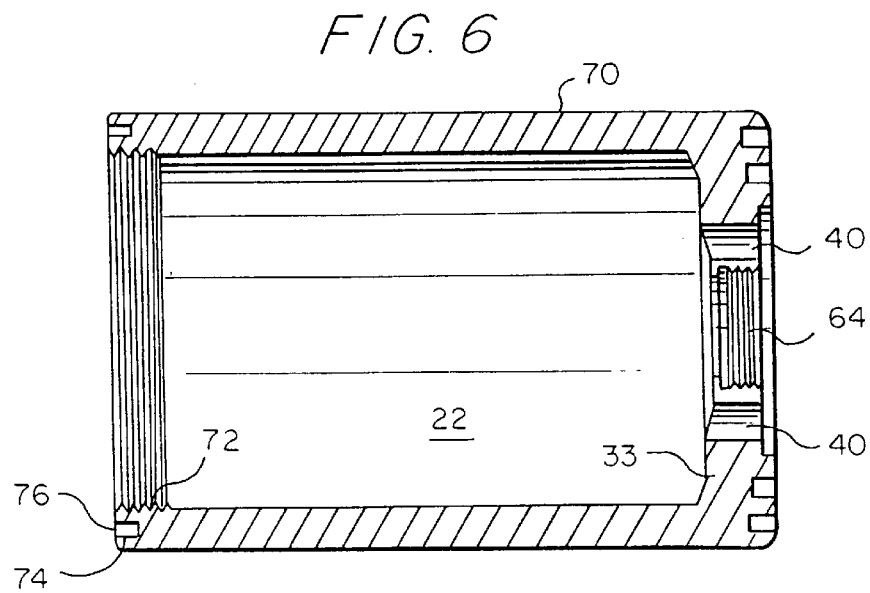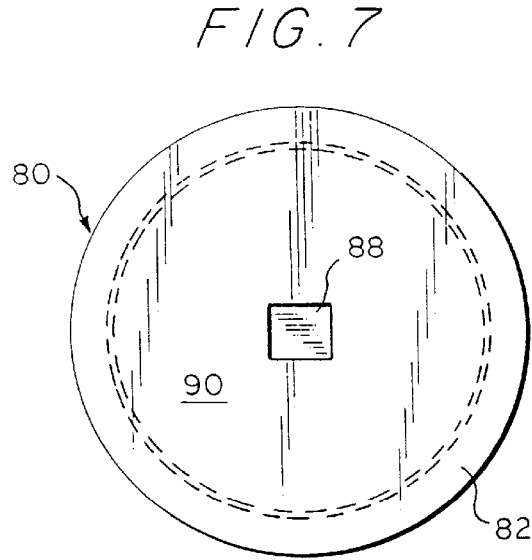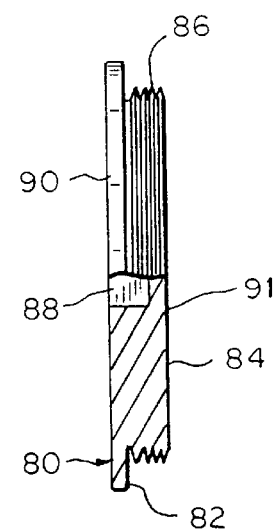

5,817,232

REBUILDABLE SPIN-ON FILTERS

RELATED APPLICATION

This application is a continuation-in-part of U.S. patent application Ser. No. 08/274,075 filed Jul. 12, 1994, now abandoned.

FIELD OF THE INVENTION

The present invention relates to rebuildable spin-on filters. More particularly, the present invention relates to rebuildable spin-on filters for lubricating oil.

BACKGROUND OF THE INVENTION

Most internal combustion engines utilized in automotive vehicles and the like are lubricated by circulating lubricating oil. The lubricating oil entrains solid contaminant particles resulting from engine wear, dirt entering the engine during operation and products of combustion. In order to prolong engine life, it is necessary to remove these contaminant particles. This is done by circulating the lubricating oil through a filter medium which in most cases is in the form of corrugated filter paper retained in a metal canister. As time passes, the filter paper becomes clogged. Engine manufacturers strongly suggest that the filter assembly, which includes the filter paper medium, be replaced after several thousand miles. The used filter assemblies must then be disposed of. Since the filter assemblies necessarily contain oil trapped in both the filter canister and in the filter medium, each used filter assembly is a potential source of pollution if disposed of in a conventional manner by deposit in a land fill. Since oil filters are usually replaced at least two to three times per year, used oil filters placed in land fills can contaminant ground water.

In order to protect the ground water, a number of states have now passed ordinances prohibiting disposing of used, canister-type, lubricating oil filters in landfills. This development has resulted in a need to reconfigure oil filters to accommodate these new regulations.

SUMMARY OF THE INVENTION

It is a feature of the present invention to provide an oil filter assembly which facilitates disposal of used oil filters while minimizing the environmental impact of such disposal.

In view of this feature and other features, the present invention is directed to a filter assembly useful for filtering lubricating oil circulated through internal combustion engines wherein the filter assembly includes a housing formed about an axis. The housing has a front end and a rear end with an end wall at the front end extending radially with respect to the axis. A plurality of inlet ports are positioned in the end wall and communicate with the interior of the housing. The inlet ports are distributed around the axis of the housing in spaced relation to the axis. An outlet port in the end wall is aligned with the axis of the housing and a removable end cap is secured to the rear end of the housing. An annular filter element is retained within the housing and has a hollow core surrounded by an annular filter medium with an outer cylindrical surface and an inner cylindrical surface disposed between front and rear end supports. The annular filter element is removably disposed within the housing with the inner surface of the filter medium isolated from the outer surface, wherein fluid flowing into the inlet ports passes through the filter medium and out through the outlet port. Since the filter element structure is readily separable from the housing, it can be separately disposed of, significantly reducing the amount of used lubricating oil which is disposed of by being trapped in or with the filter element.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side view, partially in elevation, illustrating a first embodiment of the filter assembly configured in accordance with the principles of the present invention;

FIG. 2 is a side elevational view of a filter element removed from the assembly of FIG. 1;

FIG. 3 is a front view of the filter assembly of FIG. 1;

FIG. 4 is an enlarged side view, partially in elevation of a first embodiment of a threaded mounting stud utilized with the filter assembly of FIG. 1;

FIG. 5 is a side view, partially in elevation illustrating a second embodiment of the threaded mounting stud used with the assembly of FIG. 1;

FIG. 6 is a side elevation of a cylindrical filter housing utilized with the filter assembly of FIG. 1;

FIG. 7 is a planar view of an end cap used with the filter assembly of FIG. 1;

FIG. 8 is a side view, partially in elevation, of the end cap of FIG. 7;

DETAILED DESCRIPTION

Figure 9:
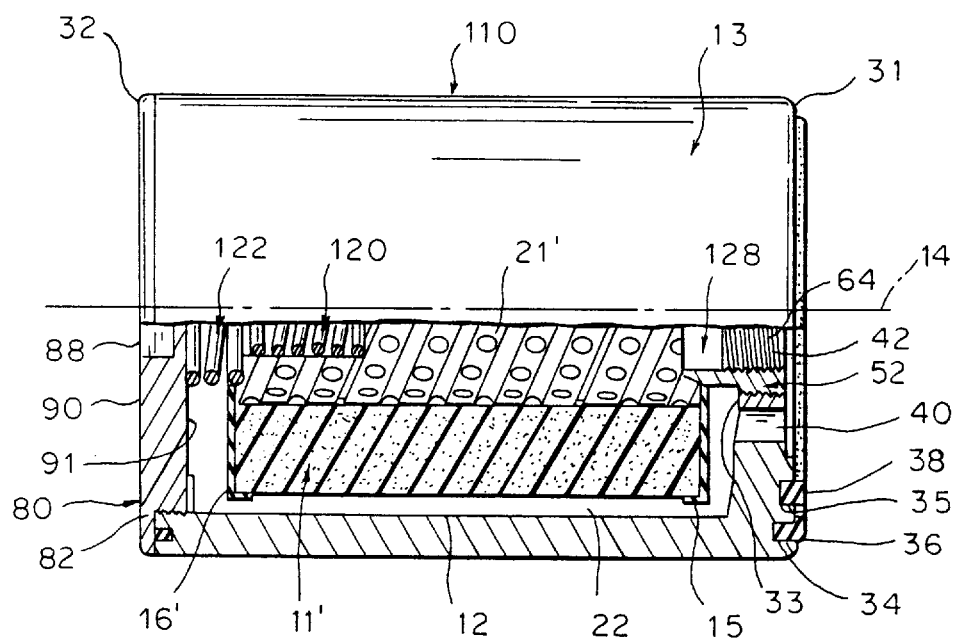
FIG. 9 is a side view, partially in elevation, illustrating a second embodiment of the invention.

Referring now to FIG. 1, there is shown a first embodiment of a rebuildable spin-on filter assembly, filter assembly 10, configured in accordance with the principles of the present invention for use with internal combustion engines (not shown). The filter assembly 10 includes an annular filter element 11 retained within an aluminum housing 13 which is concentric with an axis 14. The filter element 11 includes a pleated filter media 12 retained between a radially open front end support 15 and a radially closed rear end support 16, which supports extend radially from a unitary annular core support 18 having circular holes 20 therethrough which communicate with a hollow core 21. In a preferred embodiment, the filter medium 12 is configured of pleated paper having exterior and interior surfaces with the interior surfaces being in communication with the holes 20 in the core support 18 and the exterior surfaces being in communication with a space 22 provided in the assembly 10. As will be explained further hereinafter, oil in the space 22 flows through the pleated filter media 12 and the holes 20 in the core support 18 to emerge in a filtered state in the hollow core 21.

Referring now to FIG. 2, it is seen that the filter element 11 is a discrete, integral unit which is separable from the filter assembly 10. In accordance with the principles of the present invention, when the oil in the engine is changed, the filter element 11 is disposed of separately instead of being disposed of with the entire assembly 10. Since the filter element 11 has a hollow core 21, oil in the hollow core 12 is separated from the filter element when the filter element is removed from the assembly. Accordingly, the only oil remaining is the residue of oil coating the surfaces of the filter element 11 and the residue remaining within the material forming the pleats of the filter media 12.

A suggested method of disposing of the used filter elements 11 is incineration the filter elements at very high temperatures in order to minimize air pollution and then to dispose of the ash in a conventional environmentally safe manner.

Another method might be to wash the filter elements with detergent solution to separate the oil therefrom and then to separate the oil from the solution for environmentally safe disposal. The cleaned filter elements 11 are then disposed of, or recycled, in an environmentally safe manner.

In order to facilitate separation of the filter element 11 from the assembly 10, the filter element is slidably received within the aluminum housing 13 which is used in place of the conventional disposable canister. The housing 13 comprises a first end 31 and a second end 32. The structure of the first end 31 is best seen in FIGS. 1 and 3 wherein a unitary end wall 33 includes a first annular groove 34 (FIG. 1) and a second annular groove 35 (FIG. 1). The annular groove 34 seats a first annular gasket 36 while the second annular groove 35 seats a second annular gasket 38 which is spaced from and concentric with the first annular groove. A recessed portion 39 formed in the end wall interiorly of the gaskets 36 and 38 includes six inlet ports 40 and an internally threaded outlet port 42.

The internally threaded outlet port 42 is defined by either the steel mounting stud 50 of FIG. 4 or the steel mounting stud 52 of FIG. 5 which differ slightly from one another in that the mounting stud 50 has a shoulder 54 thereon. The studs 50 and 52 have internal threads 56 and 58, respectively, for threading with an inlet tube of the engine (not shown) and external threads 60 and 62 for threading with internal threads 64 (see FIG. 1) in the end wall 33.

As is seen in FIG. 6, the housing 13 includes a barrel portion 70 which is unitary with and extends from the end wall 33. The barrel portion 70 defines the space 22 into which oil flows from the input ports 40. The second end of the cylindrical housing 32 includes internal threads 72 and a groove 74 with an axially facing gasket 76.

Referring now primarily to FIGS. 7 and 8, a threaded end cap 80 having radially extending flange 82 and a plug portion 84 which is externally threaded with threads 86, threads into the rear end 32 of the housing 13 to close and seal the rear end of the housing. In order to facilitate attaching and removing the end cap 80, a square recess 88 is formed through the outer surface 90 of the end cap. The recess 88 receives non-rotatably the head of a tool (not shown) so that the end cap 80 may be rotated in order to be screwed into or unscrewed from the barrel portion 70 of the housing 13. The outer surface 90 and the inner surface 91 of the end cap 80 are preferably substantially planar in a radial direction with respect to the axis 14 of the filter assembly 10, thus configuring the end cap as a disk and minimizing the axial length of the filter assembly.

Preferably the barrel portion 70 and end cap 80 are both fabricated by being cast of aluminum while the mounting studs 50 and 52, which couple directly with the engine are made of steel.

Referring again to FIG. 1, in order to facilitate retaining the filter element 11 tightly within the barrel portion 70 of the housing 13, an annular spacing gasket 100 of resilient material is disposed between the rear end plate 16 of the filter element and the end cap 80. The spacing gasket 100 has a radial width greater than its axial thicknesses. A coil spring 102 is disposed within a spring steel up-front bypass valve 104. The up-front bypass valve 104 is configured to allow the filter element 11 to be bypassed if the filter media 12 becomes clogged. The up-front bypass valve 104 bears against a molded anti-drainback valve 106 which closes to seal the inlet ports 40 when the engine (not shown) on which the filter assembly 10 is mounted is not running.

In the present embodiment, up-front bypass valve 104 and anti-drainback valve 106 are components which are slidably received in the housing 13 and are slidably removed from the housing so as to be disposed of when the filter element 11 is changed. These retaining elements are furnished as a kit and are replaced each time the filter assembly 10 is "rebuilt" with a fresh filter element 11. Preferably, the spacing gasket 100 is integral with the filter element 11 and is disposed of and introduced each time the filter element 11 is changed.

When it is necessary to change the filter element 11, lubricating oil within the housing 13 (including the oil in hollow core 21) is drained into a container (not shown) upon removing the rear end cap 80. Consequently, the bulk of the oil within the oil filter assembly 10 is recycled in the same manner as oil drained from the engine block. Accordingly, the only oil which must be disposed of by an approach other than the usual recycling, is residual oil coating the filter element 11 and suspended in the material of the filter media 12.

Figure 10:
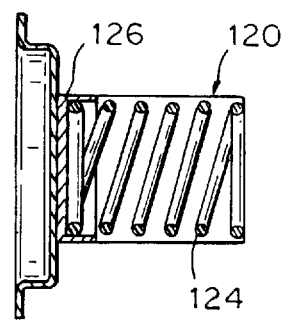
FIG. 10 is a side elevation of a bypass valve used with the second embodiment.

Referring now to FIGS. 9 and 10, there is shown a second embodiment, filter assembly 110, of the invention which is similar to the first embodiment. The second embodiment 110 differs from the first embodiment 10 of FIG. 1 in that the bypass valve 120 of the second embodiment 110 is disposed between the threaded end cap 80 and a coil spring 122 instead of between the filter element 11' and an anti-drainback valve, as is the case with the bypass valve 104 of FIG. 1. In the embodiment of FIGS. 9 and 10, the spacing gasket 100 is not used because the assembly is biased together with coil spring 122.

As is seen in FIG. 10, the bypass valve 120 is a separate component with an internal coil spring 124 which biases a valve plate 126 to its closed position. When pressure in the housing 10 exceeds a predetermined level, the force exerted by the spring 124 is exceeded pushing the valve plate to an open position so that the lubricating oil flows through the bypass valve into the hollow core 21' of the filter element 11'. The bypass valve 120 and coil spring 122 are separate from the filter element 11 so that when the filter element is disposed of, the bypass valve 120, coil spring 122 and filter element (which includes the oil soaked filter media 12) are disposed of (or perhaps recycled) separately.

In the embodiment of FIG. 9, the filter element 11' has an end plate 16' which is annular so that the bypass valve 120 seats in the hollow core 21' of the filter element. The force of the coil spring 122 bearing on the bypass valve 120 urges the filter element 11' against an annular filter element support 128, which in turn seats against the end wall 33 at the first end 31 of the aluminum housing 13. The aluminum housing 13 is therefore useable with either the first embodiment of the invention (FIG. 1) or the second embodiment of the invention 110 (FIG. 9).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A rebuildable filter assembly for filtering lubricating oil circulated through an internal combustion engine, the filter assembly comprising:

a cast aluminum housing having a barrel portion defining an interior space formed about an axis, the housing having a front end and a rear end, a joined unitary end wall at the front end extending radially with respect to the axis and internal threads on the barrel at the rear end of the housing;

the unitary end wall having a pair of grooves therein, each receiving a gasket for sealing against an engine on which the filter is adapted to be mounted;

a plurality of inlet ports in the unitary end wall, the inlet ports communicating with the interior space of the housing, and being distributed around the axis in spaced relation to the axis;

a central threaded outlet port in the unitary end wall, the outlet port being aligned with the axis of the housing;

and an internally threaded steel bushing including an exteriorly threaded surface that is threaded into the outlet port and a threaded interior surface for threading onto an exteriorly threaded surface of an inlet tube of the engine, wherein said bushing includes an end portion that extends into the interior space of said housing;

a removable end cap secured to the rear end of the housing, the end cap being made of cast aluminum having an externally threaded portion threadably coupled to the threads of the barrel portion at the rear end of the housing, the end cap having a radial flange for sealing against an annular gasket disposed between the end cap and housing;

an annular filter element held within the housing by axial abutment only, the annular filter element having a hollow core surrounded by an annular filter media with an outer surface and an inner surface, the annular filter media being disposed between an open front end support and an open rear end support, and the annular filter element being slidably received in the housing and held therein by the removable end cap;

a bypass valve held within the housing by axial abutment and having opposed front and rear ends, wherein the rear end of said bypass valve includes an aperture that receives the end portion of said bushing, whereby said bypass valve is configured and arranged to normally provide fluid communication between the hollow core of said filter element and said inlet ports when the filter is in an unclogged condition and to cause directed fluid communication between said inlet ports and said outlet port when said filter is in a clogged condition;

a spacing gasket abuttingly disposed between the end cap and the rear end support of the filter element, the spacing gasket having a radial width greater than its axial thickness, wherein the spacing gasket urges the front end support of the filter element into abutment with the bypass valve and the bypass valve towards the outlet port, wherein, in the housing, the inner surface of the filter media is isolated from the outer surface so that fluid flowing into the inlet ports passes through the filter medium and out through the outlet port, whereby upon removing the end cap, the annular filter media and bypass valve are separated from the housing and end cap for separate disposal, and the housing and end cap are reusable upon replacing the filter media; and an annular anti-flow back valve abuttingly disposed between the front end of the bypass valve and the unitary end wall for covering said plurality of inlet ports, the anti-flow back valve having a central aperture receiving the end portion of said bushing and being removable from the housing upon replacing the filter media;

wherein the end portion of said bushing maintains said bypass valve and said anti-flow back valve in coaxial alignment with said outlet port.

2. The rebuildable end cap of claim 1, wherein the end cap has a recess therein for non-rotatably receiving a tool to rotate the cap for attaching to the cap and to remove the cap from the housing.

3. A rebuildable filter assembly useful for filtering lubricating oil circulated through an internal combustion engine, the filter assembly comprising:

a cast aluminum housing having a barrel portion defining an interior space formed about an axis, the housing having a front end and a rear end, a unitary end wall at the front end extending radially with respect to the axis and internal threads on the barrel at the rear end of the housing, the unitary end wall having a pair of grooves therein, each receiving a gasket for sealing against an engine on which the filter is adapted to be mounted;

a plurality of inlet ports in the unitary end wall, the inlet ports communicating with the interior space of the housing and being distributed around the axis in spaced relation to the axis;

a central threaded outlet port in the unitary end wall, the outlet port being aligned with the axis of the housing and an internally threaded steel bushing including an exteriorly threaded surface that is threaded into the outlet port and a threaded interior surface for threading onto an exteriorly threaded surface of an inlet tube of the engine, wherein said bushing includes an end portion that extends into the interior space of said housing;

a removable end cap secured to the rear end of the housing, the end cap being made of cast aluminum having an externally threaded portion threadably coupled to the threads on the barrel portion at the rear end of the housing, the end cap having a radial flange portion for sealing against an annular gasket disposed between the end cap and housing;

an annular filter element held within the housing by axial abutment only, the annular filter media having a hollow core surrounded by an annular filter media with an outer surface and an inner surface, the annular filter media being disposed between an annular front end support and an annular rear end support, wherein the end portion of said bushing is disposed within a central aperture of said annular front end support for maintaining said annular front end support in coaxial alignment with said outlet port, and the annular filter element being slidably received in the housing and held therein by the removable end cap;

a bypass valve held within the housing by axial abutment and having opposed front end and rear ends, the bypass valve being received through the rear end support of the filter element and projecting into the hollow core of the filter element, said bypass valve being configured and arranged to normally provide fluid communication between the hollow core of said filter element and said outlet port when the filter is in an unclogged condition and fluid communication between said inlet ports and said outlet port when said filter element is in a clogged condition;

a spring abuttingly disposed between the end cap and the bypass valve, wherein the spring urges the bypass valve into abutment with annular rear end support of the filter element and the annular front end support of the filter element into sealing engagement with said unitary end wall about the outlet port and wherein, in the housing, the inner surface of the filter media is isolated from the outer surface so that fluid flowing into the inlet ports passes through the filter medium and out through the outlet port.

4. The rebuildable end cap of claim 3, wherein the end cap has a recess therein for non-rotatably receiving a tool to rotate the cap for attaching to the cap and to remove the cap from the housing.

* * * * *